US012605671B2

(12) United States Patent
De Neve et al.

(10) Patent No.: US 12,605,671 B2
(45) Date of Patent: Apr. 21, 2026

(54) DEVICE AND PROCESS FOR THE DIRECT CARBON DIOXIDE CAPTURE FROM AIR

(71) Applicant: Carbyon Holding B.V., Eindhoven (NL)

(72) Inventors: Hans Maria Paul De Neve, Turnhout (BE); Jasper Anne Frido Marikus Simons, Eindhoven (NL); Dries Van Eyck, Turnhout (BE); Aswin Schouten, Ghent (BE)

(73) Assignee: Carbyon Holding B.V., Eindhoven (NL)

( * ) Notice: Subject to any disclaimer, the term of this patent is extended or adjusted under 35 U.S.C. 154(b) by 496 days.

(21) Appl. No.: 18/005,615

(22) PCT Filed: Jul. 19, 2021

(86) PCT No.: PCT/EP2021/070183
§ 371 (c)(1),
(2) Date: Jan. 16, 2023

(87) PCT Pub. No.: WO2022/013456
PCT Pub. Date: Jan. 20, 2022

(65) Prior Publication Data
US 2023/0264137 A1     Aug. 24, 2023

(30) Foreign Application Priority Data
Jul. 17, 2020     (EP) ..................................... 20186471

(51) Int. Cl.
B01D 53/02          (2006.01)
B01D 53/04          (2006.01)
(Continued)

(52) U.S. Cl.
CPC .......... B01D 53/0438 (2013.01); B01J 20/22 (2013.01); B01J 20/28045 (2013.01);
(Continued)

(58) Field of Classification Search
CPC ................ B01D 53/0438; B01D 53/04; B01D 2253/108; B01D 2253/204;
(Continued)

(56) References Cited

U.S. PATENT DOCUMENTS 8,500,855 B2      8/2013  Eisenberger
2007/0149398 A1*  6/2007  Jones ................... B01J 20/3219
                                                      423/230
(Continued)

FOREIGN PATENT DOCUMENTS

WO     2016150557 A1     9/2016
WO     2019161420 A1     8/2019
WO     2019165151 A1     8/2019

OTHER PUBLICATIONS

Didas, S.A., Choi, S., Chaikittisilp, W. and Jones, C.W., 2015. Amine-oxide hybrid materials for CO2 capture from ambient air. Accounts of chemical research, 48(10), pp. 2680-2687.
(Continued)

*Primary Examiner* — Frank M Lawrence, Jr.
(74) *Attorney, Agent, or Firm* — Ipsilon USA—NLO

(57)          ABSTRACT

The present invention is based on the use of surface adsorption to capture $CO_2$ molecules from air, without requiring the need for bulk absorption within the bulk of the sorbent. Since surface adsorption is a much faster process than bulk absorption, the present invention offers a greatly increased $CO_2$ capture rate, as well as a greatly improved energy efficiency, over conventional systems. The invention involves the use of a molecular monolayer of $CO_2$ sorbent, a process and a system for capturing $CO_2$ from air employing such a molecular monolayer of $CO_2$ sorbent.

19 Claims, 3 Drawing Sheets

Legend:
░ microporous structure
░ $CO_2$ sorbent
° $CO_2$ molecule

(51) Int. Cl.
B01D 53/06 (2006.01)
B01J 20/22 (2006.01)
B01J 20/28 (2006.01)
B01J 20/34 (2006.01)

(52) U.S. Cl.
CPC ..... B01J 20/2808 (2013.01); B01J 20/28083
(2013.01); B01J 20/3425 (2013.01); B01J
20/3483 (2013.01); *B01D 2253/108* (2013.01);
*B01D 2253/204* (2013.01); *B01D 2253/25*
(2013.01); *B01D 2253/308* (2013.01); *B01D*
*2253/3425* (2013.01); *B01D 2257/504*
(2013.01); *B01D 2258/06* (2013.01); *B01D*
*2259/40088* (2013.01)

(58) Field of Classification Search
CPC .......... B01D 2253/25; B01D 2253/308; B01D
2253/3425; B01D 2257/504; B01D
2258/06; B01D 2259/40088; B01D
2256/10; B01D 53/06; B01D 53/02; B01J
20/22; B01J 20/28045; B01J 20/2808;
B01J 20/28083; B01J 20/3425; B01J
20/3483; Y02C 20/40

USPC ...... 95/107, 113, 139; 96/153, 154; 423/230
See application file for complete search history.

(56) References Cited

U.S. PATENT DOCUMENTS

2018/0099244 A1    4/2018  Okano
2018/0207612 A1*   7/2018  Prelot ............... B01J 20/28016

OTHER PUBLICATIONS

Darunte, L.A., Terada, Y., Murdock, C.R., Walton, K.S., Sholl, D.S. and Jones, C.W., 2017. Monolith-supported amine-functionalized Mg2 (dobpdc) adsorbents for CO2 capture. ACS applied materials & interfaces, 9(20), pp. 17042-17050.
Goeppert, A., Czaun, M., May, R.B., Prakash, G.S., Olah, G.A. and Narayanan, S.R., 2011. Carbon dioxide capture from the air using a polyamine based regenerable solid adsorbent. Journal of the American Chemical Society, 133(50), pp. 20164-20167.

* cited by examiner

Legend:

microporous structure $CO_2$ sorbent

*   $CO_2$ molecule

DEVICE AND PROCESS FOR THE DIRECT CARBON DIOXIDE CAPTURE FROM AIR

FIELD OF THE INVENTION

The present invention is in the field of carbon dioxide capture, particularly in the field of direct capture of carbon dioxide from air. The invention involves a device and a process for the direct capture of carbon dioxide from air, as well as the use of a molecular monolayer of $CO_2$ sorbent for capturing $CO_2$ from air.

BACKGROUND ART

The desire to reduce the carbon dioxide footprint of mankind has led to the recent development of many process wherein $CO_2$, the major greenhouse gas accounting for global warming, is used as feedstock for useful products. Ironically, these emerging technologies are hampered by the limited availability of $CO_2$. Processes to capture $CO_2$ from gases rich in $CO_2$, such as industrial flue gases, have been developed, but cannot account for the demand for $CO_2$. Furthermore, such processes may lower the emission of $CO_2$ into the environment, the concentration of $CO_2$ already present in the environment is not affected. Hence, there is a need for capturing $CO_2$ directly from air, which would lower the $CO_2$ concentration in the environment and provide a further renewable source of $CO_2$.

Current known devices and processes for capturing $CO_2$ from air have very low efficiency, which is in view of the low $CO_2$ concentrations in air highly detrimental to the economic viability of such a process. An overview of existing processes is provided in *Direct air capture of $CO_2$ with chemicals—A technology assessment for the APS panel on public affairs*, Jun. 1, 2011, APS Physics (https://www.aps.org/policy/reports/assessments/upload/dac2011.pdf) and Sanz-Perez et al., *Chem. Rev.* 2016, 116, 11840-11876.

Carbon Engineering developed a system wherein $CO_2$ sorbent is dissolved in an aqueous thin film. Air passes through the film (thickness 50 μm), after which it is transferred to a regeneration unit, where $CO_2$ is desorbed from the sorbent in solution. The thin films ensures that only small pressure differences are needed to enable contact of the air with the $CO_2$ sorbent. However, the big downside of this system is the energy intensive regeneration of the dissolved sorbent. High temperatures are required, which leads to high operation costs.

Also known are fluidized bed reactors, see e.g. Zhang et al., *Chemical Engineering Science*, 2014, 116, page 306-316. Air is blown through a bed containing porous particles wherein the pores have been coated with $CO_2$ sorbent. Since air will more easily pass between the particles than through the interior of the particles, the effective contact time between air and sorbent is much lower than the actual residence time of the air in the bed. In order to ensure sufficient contact time between air and $CO_2$ sorbent, a bed height of about 7 meters is typically required, meaning that effort is needed to force the air through this large column, i.e. a high pressure difference to allow air to pass through the column, which is energy intensive.

WO 2015/103401 describes a system for removing carbon dioxide from a gas mixture, the system comprising two groups of carbon dioxide removal structures, each removal structure within each group comprising a porous solid substrate supported on the structure, each porous substrate having a sorbent supported upon its surfaces, the sorbent being capable of adsorbing or binding to carbon dioxide, to remove carbon dioxide from a gas mixture.

WO 2015/006259 describes a process for separating $CO_2$ from a gas stream, comprising passing the gas stream over a sorbent that adsorbs the $CO_2$ and recovering the $CO_2$ by concentration swing adsorption and adsorptive displacement. The process does not rely on a temperature swing adsorption. The sorbent may comprise an alkalized substrate.

The present invention provides in the need for quick and efficient capturing of $CO_2$ directly from air, minimizing the time and energy associated with current $CO_2$ capture processes.

SUMMARY OF THE INVENTION

The inventors have developed a system that is capable of using the surface adsorption of $CO_2$ sorbents, without utilizing bulk absorption within the bulk of the sorbent. $CO_2$ molecules were found to efficiently bind to the surface of the solid state $CO_2$ sorbent. Since surface adsorption is a much faster process than bulk absorption, the present invention offers a greatly increased $CO_2$ capture rate, as well as a greatly improved energy efficiency, over conventional systems.

The inventors have developed a use, a device and a process for the capture of $CO_2$ directly from air. The invention can be defined according to the following list of preferred embodiments:

1. Use of a molecular monolayer of $CO_2$ sorbent for capturing $CO_2$ from air, wherein the sorbent is coated onto the pore walls of a porous support.
2. Use according to embodiment 1, wherein $CO_2$ sorption occurs via surface adsorption and not via bulk absorption.
3. The use according to embodiment 1 or 2, wherein the sorbent is coated on a microporous support.
4. The use according to any one of the preceding embodiments, wherein the support contains needle-shaped pores with a diameter in the range of 1-10 nm and a length in the range of 1-10 μm, wherein the surface of the pores is coated with the sorbent while the central part is free of sorbent and open to receive gaseous molecules.
5. The use according to any one of the preceding embodiments, wherein the porous support comprises a macroporous structure layered on top of a microporous structure, preferably wherein the macroporous structure is a sandwich of foils or a honeycomb structure.
6. The use according to embodiment 5, wherein air is led through the macroporous structure to enable a flow of air perpendicular to the micropores of the microporous structure and $CO_2$ molecules diffuse into the interior of the pores where they are adsorbed onto the sorbent.
7. A process for capturing $CO_2$ from air, comprising:
   (i) providing a flow of air through the sorption chamber over the surface of a microporous structure, containing a molecular monolayer of $CO_2$ sorbent coated on the interior surface of the pores, to obtain air depleted in $CO_2$ and a loaded $CO_2$ sorbent;
   (ii) moving the microporous structure containing the loaded $CO_2$ sorbent from the sorption chamber to a regeneration chamber;
   (iii) regenerating the $CO_2$ sorbent at the regeneration chamber to obtain a product flow comprising $CO_2$ and regenerated $CO_2$ sorbent.

8. The process according to embodiment 7, wherein the process further comprises:

(iv) moving the microporous structure containing the regenerated $CO_2$ sorbent from the regeneration chamber to the sorption chamber;

and wherein steps (i)-(iv) are repeated.

9. The process according to embodiment 7 or 8, wherein the cycle time is in the range of 0.1-60 seconds for step (i) and in the range of 0.1-60 seconds for step (iii).

10. A device for capturing $CO_2$ from air, comprising:

(a) a molecular monolayer of solid state $CO_2$ sorbent coated on the interior surface of the pores of a microporous structure for capturing $CO_2$ from air;

(b) at least one sorption chamber;

(c) at least one regeneration chamber;

(d) means for transporting the microporous support structure from the sorption chamber to the regeneration chamber and back;

(e) means for effecting a flow of air over the sorbent support structure through the sorption chamber;

(f) at least one outlet for discharging $CO_2$, located in the regeneration chamber; and (g) means for regenerating the sorbent in the regeneration chamber.

11. The device according to embodiment 10, wherein the pores have a diameter in the range of 1-10 nm and a length in the range of 1-10 μm.

12. The device according to embodiments 10 or 11, further comprising means for enabling close contact of the flow of air with the sorbent and/or the pores, wherein the means are selected from a sandwich of foils or a honeycomb structure.

13. The device according to any one of embodiments 10-12, further including transporting means to shift the sorbent from absorption to regeneration phase.

14. The device according to any one of embodiments 10-13, wherein means (g) are capable of heating the $CO_2$ sorbent when positioned within the regeneration chamber to a temperature in the range of 50-180° C., preferably 60-150° C., most preferably 65-100° C.

15. The use according to any one of embodiments 1-6, the process according to any one of embodiments 7-9, or the device according to any one of embodiments 10-14, wherein the $CO_2$ sorbent is selected from the group consisting of bicarbonate-based sorbents, amine-based sorbents, zeolites and metal-organic frameworks.

DETAILED DESCRIPTION

The inventors have for the first time used a molecular monolayer of $CO_2$ sorbents for surface adsorption of $CO_2$ to capture $CO_2$ from air. Conventional systems rely on the absorption of $CO_2$ in the bulk of the sorbent. Surface adsorption is a much quicker process than bulk absorption, as it avoids solid state diffusion. The capacity of a certain volume of sorbent is significantly reduced when only surface adsorption takes place, as the interior of the sorbent is not utilized for capturing $CO_2$. Because of this reduced capacity, the sorbent is more quickly saturated with $CO_2$, such that shorter cycle times can be achieved for the sorbent to switch between a sorption stage and a regeneration stage. The inventors have developed a device which enables such short cycle times. Lower sorbent mass and hence lower $CO_2$ sorption capacity due to the monolayer is negated by making use of a high surface area support structure.

To enable efficient surface adsorption of $CO_2$ and utilize the sorption capacity maximally, the support structure of sorbent is designed to allow for a maximal surface area with the least amount of sorbent. Preferably, a hierarchical pore geometry is provided by the support, with small pores the interior of which is coated with the sorbent (microporous structure), and larger pores or other structures (macroporous structure) to guide the flow of air towards the entrances of the pores. For the working of the present invention, it is essential that at least the interior walls of the pores is coated with the $CO_2$ sorbent. However, the surface of the microporous support outside the pores may also be coated with the $CO_2$ sorbent. As such, a monolayer of sorbent is used in order to promote surface adsorption over bulk absorption. In that light, extremely thin layers, such as a single molecular layer, are highly advantageous. In order for these thin layers to have sufficient strength, it is needed to coat them on a supporting layer. Any type of hierarchical structure comprising a support coated with a sorbent is suitable in the context of the present invention. In an especially preferred embodiment, defined in more detail below, the supporting layer is microporous structure containing needle-shaped micropores.

There are extensive gains in the adsorption speed because the diffusion of $CO_2$ molecules to the surface of the sorbent is much faster than the diffusion of $CO_2$ molecules through a solid sorbent material. This increase in speed leads to a higher adsorption rate, meaning that for the same power consumption of passing air along the sorbent, much more $CO_2$ is adsorbed per unit of time. The same applies for the regeneration: it only takes a short heat pulse to release the $CO_2$ molecules from the surface, since those are only adsorbed to the surface of the sorbent. This means that both sorption and regeneration take place in much shorter time scales than when thicker layers of sorbent are used. Typically, both sorption and regeneration take place on a second to minute time scale. The exact time scale depends on the available surface and the volume rate of air that passes along the surface of the microporous material.

It is not required, and even disadvantageous, for air to be forced into the pores. First of all, forcing air through narrow pores results in a large pressure drop over the membrane. The design developed by the inventors avoids the need for large pressure drops or pressure differences of the air passing through the device. Instead, air passes over the surface of the device without much effort, wherein the surface refers to the surface of the microporous structure containing the pores that are coated with the sorbent. The use of a hierarchical structure, combining the microporous structure coated with the solid state $CO_2$ sorbent at the interior surface of the pores to capture the $CO_2$, with a macroporous structure for guiding the air towards the microporous structure is highly preferred. This enables to keep the pressure drop of air as low as possible, by enabling most air molecules to get a free passage, while bringing the $CO_2$ molecules sufficiently close to the entrance of the pores of the microstructure, thus allowing diffusion of $CO_2$ molecules into the pores. The low pressure difference required to use this hierarchical structure minimizes the energy budget of the process. Typically, the present invention is able to operate with pressure differences in the order of a few hundred Pascals. Furthermore, since air is not forced into the pores, a difference in partial pressure of $CO_2$ is established between in the interior of the pores, where $CO_2$ pressure is lower in view of the adsorption thereof on the sorbent, and the outside of the pores, where $CO_2$ pressure is higher as in the incoming air. Due to this pressure difference, specifically $CO_2$ diffuse into the pores, while other gaseous species, which do not experience such a difference in partial pressure, are substantially not diffused into the pores. Of course, regular diffusion without partial pressure difference but in view of molecular motion will still occur, but does not hamper the enhanced diffusion of $CO_2$. This enhanced diffusion of $CO_2$ occurs as long as the sorbent within the pores is not fully saturated.

First and foremost, the present invention provides the use of a molecular monolayer of $CO_2$ sorbent coated on a porous structure for capturing $CO_2$ directly from air. Alternatively worded, the invention provides the use of a $CO_2$ sorbent for capturing $CO_2$ from air, wherein $CO_2$ sorption occurs via surface adsorption and not via bulk absorption. The present invention further provides a device and a process for capturing $CO_2$ directly from air. The device according to the invention is intended to be used with the process according to the invention. Likewise, the process according to the invention is intended to be performed in the device according to the invention. Anything disclosed herein for the process according to the invention equally applies to the device according to the invention and the use according to the invention, and anything disclosed herein for the device according to the invention equally applies to the process according to the invention and the use according to the invention.

The Device

The device for capturing $CO_2$ from air according to the invention comprises:

(a) a molecular monolayer of solid state $CO_2$ sorbent coated on the interior surface of the pores of a microporous support structure for capturing $CO_2$ from air;

(b) at least one sorption chamber;

(c) at least one regeneration chamber;

(d) means for transporting the microporous support structure from the sorption chamber to the regeneration chamber and back;

(e) means for effecting a flow of air over the sorbent support structure through the sorption chamber;

(f) at least one outlet for discharging $CO_2$, located in the regeneration chamber; and (g) means for regenerating the sorbent in the regeneration chamber.

The "device" may also be referred to as a "system" or an "apparatus". The core of the device according to the invention is a monolayer of $CO_2$ sorbent that enables the sorption of $CO_2$ molecules. The sorbent typically is a solid state $CO_2$ sorbent. Solid state $CO_2$ sorbents are known in the art. Any material that is capable to adsorb $CO_2$ molecules at room temperature is suitable as solid state $CO_2$ sorbent. The sorbent may also be referred to as an adsorbent. The sorbent is capable of releasing the adsorbed molecules of $CO_2$ upon regeneration, typically by temperature increase, pressure decrease and/or moisture (steam) addition. In a preferred embodiment, the sorbent is capable of releasing the adsorbed molecules of $CO_2$ at elevated temperature, preferably in the range of 50-300° C., such as in the range of 50-100° C. or in the range of 60-200° C., more preferably in the range of 65-100° C., such as in the range of 65-80° C. or in the range of 65-75° C. The skilled person finds further guidance in selecting a suitable sorbent in Sanz-Perez et al., *Chem. Rev.* 2016, 116, 11840-11876, which is incorporated by reference herein. Preferably, the sorbent is amine-based and/or bicarbonate-based. Such sorbents are known in the art, and include polyethylene imine (PEI) and potassium bicarbonate ($KHCO_3$). Also some zeolites and metal-organic frameworks (MOFs) are suitable sorbents for $CO_2$. In a preferred embodiment, the $CO_2$ sorbent is selected from the group consisting of bicarbonate-based sorbents, amine-based sorbents, zeolites and metal-organic frameworks. Preferably, the $CO_2$ sorbent is a bicarbonate-based sorbents or an amine-based sorbents. Most preferably, the $CO_2$ sorbent is an amine.

The sorbent is coated on a support, typically a microporous support. Any suitable technique known in the art is suitable to prepare the sorbent layer and microporous support, such as chemical vapour deposition, atomic layer deposition, molecular layer deposition, impregnation and grafting. Preferably, an impregnation method, advantageously a wet impregnation method, is used to coat the interior walls of the micropores with sorbent. The microporous support may be prepared by deposition onto a macroporous support, for example by any of the techniques listed here, and the sorbent layer may be prepared by deposition onto the microporous layer, for example by any of the techniques listed here. For example, the microporous support is prepared by plasma-enhanced chemical vapour deposition (PECVD), see e.g. WO 2016/163878. The microporous support may be of any suitable material. Advantageously, the material has a high surface density (a lot of surface per gram of material), such as for example in the range of 100-5000 $m^2/g$, preferably in the range of 500-4000 $m^2/g$, most in the range of 1000-3000 $m^2/g$. Also relevant is the amount of internal surface per square meter of membrane of 1 mm width, as that defines the amount of surface available per volume unit of porous material. Preferably, the amount of internal surface per square meter of membrane of 1 mm width is in the range of $1\times10^3$-$1\times10^6$ $m^2/m^2$, more preferably in the range of $1\times10^4$-$5\times10^5$ $m^2/m^2$, most preferably in the range of $5\times10^4$-$3\times10^5$ $m^2/m^2$.

The thickness of the sorbent layer is a single molecule. The layer is thus referred to as "molecular monolayer" or "monomolecular layer". Such monolayers are known in the art. For example, in case the $CO_2$ sorbent is an amine, the molecular monolayer contains one layer of amine groups coated on the support. Thicker layers, wherein amine groups are embedded in the bulk of the sorbent, even when the amine groups that are located deeper in the sorbent layer would be covalently attached to the amine groups at the surface, are not considered in the present invention. The total thickness of the thin layer or sorbent is 1 molecule. Herein, the unit of length molecules refers to the (smallest) diameter of one molecule of sorbent material. The skilled understand that "molecules" may also refer to "atoms" or "ions" when the sorbent is an atomic or an ionic species, such as potassium bicarbonate. Alternatively, the thickness of the sorbent layer is preferably in the range of 0.1-50 nm, such as in the range of 0.5-50 nm, more preferably in the range of 0.3-10 nm, such as in the range of 0.5-10 nm, most preferably in the range of 0.3-3 nm. The skilled person will understand that the thickness of the layer will depend on the specific sorbent, as long as a monomolecular layer of sorbent is present. For example, when amines are used, the preferred thickness of the sorbent layer is for example 0.1-3 nm, more preferably 0.1-1 nm, most preferably 0.1-0.5 nm. Also, the skilled person is capable of determining the thickness of the layer, both in nm and in number of molecules, for example by measuring the weight increase upon application of the sorbent with a given internal surface per gram. Such thicknesses of the monolayer allow efficient sorption of the $CO_2$ molecules comprised in the air onto the sorbent. An additional advantage of the thin layer is that it can be heated and cooled in a relatively short amount of time, which allows for a quick adsorption and regeneration cycle.

The pores may be needle-shaped or may be open-ended channels. These pores are relatively narrow and long. The diameter of the pores is preferably in the range of 0.5-20 nm, such as 5-20 nm, more preferably in the range of 1-10 nm, such as 5-10 nm. Herein, the diameter refers to the diameter of the pore prior to coating with the monomolecular layer of sorbent. The length of the pore is not particularly limited in the context of the present invention. Typically, the length may be in the range of 0.5-50 μm, such as 1-50 μm, more preferably in the range of 1-10 μm. The needle-shaped pores have only one opening, to the side where the flow of air is effected when the device is in use. The other side of the pore channel is closed, such that no air can escape on that side. Open-ended pores or "channels" are open at both ends. These channels may also form interconnected networks. The flow of air is effected at least on one end of the open-ended pore, but may also occur on both ends of the open-ended pore. The surface of the pores is coated with the sorbent while the central part is free of sorbent and open to receive gaseous molecules. During operation, gaseous molecules from the air will enter the pores and $CO_2$ molecules will adsorb onto the sorbent, as such creating a gaseous environment with reduced $CO_2$ partial pressure. In view of the narrow nature of the pores, the air will largely stand still within the pores while a flow of air is present just outside the opening of the pores. In view of the reduced partial pressure of $CO_2$, mainly $CO_2$ molecules will diffuse into the pores, where they are also adsorbed onto the sorbent, as such maintaining the reduced partial pressure of $CO_2$ until the sorbent is saturated. As such, a concentration gradient is established, with a high $CO_2$ concentration outside the pores and a low $CO_2$ concentration inside the pores. Other molecules present in the flow of air, which are not adsorbed by the sorbent, do not diffuse, or to a much smaller extent, into the pores, as there is no reduced partial pressure of these molecules in the pores. As such, $CO_2$ molecules are selectively sucked out of the flow of air and captured onto the sorbent. Also, since other molecules do not enter the pores to a large extent, the amount of interactions between the sorbent and a gaseous $CO_2$ molecule increases, which in turn increases the probability of such an interaction to lead to an adsorbed $CO_2$ molecule. This phenomenon further increases the rate at which $CO_2$ is adsorbed, enabling even more efficient $CO_2$ capture directly form air.

Preferably, the microporous structure contains needle-shaped pores, which preferably have a diameter in the range of 0.5-20 nm and a length of 0.5-50 μm, and the interior surface area of the needle-shaped pore is coated with a thin layer of sorbent. Thus, the surface of the pores is coated with the sorbent while the central part is free of sorbent and open to receive gaseous molecules. Preferably, the dimensions of the pores are a diameter in the range of 0.5-20 nm, such as 5-20 nm, more preferably in the range of 1-10 nm, such as 5-10 nm and a length in the range of 0.5-50 μm, such as 1-50 μm, more preferably in the range of 1-10 μm.

Preferably, the device according to the invention further includes transporting means to shift the sorbent-coated porous support from sorption to regeneration chamber. In the context of the present invention, "transporting" may also be referred to as "moving". In one embodiment, the transporting means are rotating means. The sorption chambers and the regeneration chambers are zones through which the solid state $CO_2$ sorbent passes. The chambers are separated from each other, typically delimited by dividing walls, allow passage of the solid state $CO_2$ sorbent support structure upon passage thereof. Typically, the segments of the dividing wall extend beyond the solid state $CO_2$ sorbent support structure and contain an opening through which the solid state $CO_2$ sorbent support structure passes during moving thereof. The device contains means (e) for effecting a flow of air over the sorbent through the sorption chamber. The flow ensures that air is brought into contact with the surface of the porous structure, such that $CO_2$ molecules will diffuse into the pores where they are adsorbed by the sorbent. Likewise, the device may contain means (e') for effecting a flow of regeneration gas over the sorbent through the regeneration chamber. The flow regeneration gas ensures that the sorbed $CO_2$ molecules are desorbed and end up in a $CO_2$-enriched product gas. For example, the regeneration gas may be the $CO_2$-enriched product gas from an earlier cycle.

In a preferred embodiment, the junction between sorption and regeneration chambers is air tight. Preferably, at least the leakage of $CO_2$ from the regeneration chamber to the sorption chamber is substantially avoided. More preferably, also the leakage of air from the sorption chamber to the regeneration chamber is substantially avoided. Leakage of $CO_2$ to the sorption chamber would directly counteract the capture of $CO_2$ from air by the sorbent. On the other hand, leakage of air to the regeneration chamber would lead to contamination of the $CO_2$ flow, in particular the $CO_2$ product stream, which is disadvantageous for the present process but can be resolved by proper handling of the product stream. Means for air-tight sealing are known in the art. In one embodiment, the air-tight sealing is accomplished by a gas curtain, wherein the gas is blown through the opening during rotation. Preferably, the gas curtain is a $CO_2$ curtain or an air curtain. Alternatively or additionally, the device is configured such that the regeneration chambers operate at (slightly) reduced pressure compared to the sorption rooms, such that any leakage of $CO_2$ from the regeneration chambers to the sorption chambers is avoided. Gas leakage between sorption and regeneration chambers can also be avoided by providing space between two adjacent chambers. Leakage of $CO_2$ from the regeneration would not contaminate the air depleted in $CO_2$ in the sorption chamber, but would end up in the open space between the chambers and can be separately collected if desired.

At the sorption chamber(s), sorption of $CO_2$ molecules onto the sorbent occurs. During operation, the conditions within the sorption chamber(s) should be favourable for $CO_2$ sorption. The optimal conditions for $CO_2$ sorption may vary from sorbent to sorbent, they typically include ambient pressure and temperature, although deviation thereof may occur without significantly jeopardizing the sorption efficiency of the device according to the invention.

At the regeneration chamber(s), regeneration of the loaded sorbent (i.e. loaded with $CO_2$ molecules) occurs. Regeneration or desorption typically occurs by heating up the solid sorbent to its desorption temperatures. During operation, the conditions within the regeneration chamber(s) should be favourable for $CO_2$ desorption. The optimal conditions for $CO_2$ desorption may vary from sorbent to sorbent, they typically include ambient pressure and elevated temperature, although deviation thereof may occur without significantly jeopardizing the efficiency of the device according to the invention. Optimal results are obtained with desorption at elevated temperature, such that the device according to the invention preferably comprises heating means as means (g) for regenerating the sorbent, wherein the heating means are capable of heating at least the sorbent, typically the regeneration chamber. The heating is typically to a temperature in the range of 50-180° C., preferably 60-150° C., most preferably 65-100° C. Preferably, the heating means (g) is capable of heating the regeneration chamber to a temperature above the temperature of the sorption chamber. The skilled person knows the optimal regeneration temperature for the sorbent employed and is capable of adjusting the temperature accordingly.

In one embodiment, the device according to the invention further comprises an air displacement device or suction device for sucking air into the device, in particular into the sorption chamber. Such suction devices are known in the art and include for example a ventilator or fan. This suction device is arranged such that air is able to be sucked into the sorption chamber.

The device preferably comprises a macroporous structure, wherein the microporous and the macroporous structure together form a hierarchical structure. Such a structure has both larger macropores and smaller micropores, for example wherein the walls of the macropores contain the micropores. The macroporous structure may be layered on top of the microporous structure, preferably wherein the macroporous structure is a sandwich of foils or a honeycomb structure as described below. Air is led through the macroporous structure to enable a flow of air in close contact with the sorbent. Preferably, the flow of air is led along the opening of the pores, for example perpendicularly to the entrances of the micropores of the microporous structure and in close proximity to the entrance of the pores. Diffusion of $CO_2$ molecules into the interior of the pores is effected by the difference in partial pressure due to adsorption of $CO_2$ onto the sorbent. Preferably, the macroporous structure forms an air channel (the macropores) over the sorbent of 50 μm-10 mm wide, preferably 75 μm-5 mm wide. Any suitable material can be used for the macrostructure. Suitable materials include stainless steel, amorphous silicon on Cu, anodized aluminium, a mesh of polymer fibres. The macroporous structure does not need to be connected to the microporous structure, such that the microporous structure, with the sorbent-coated pores, can move with respect to the macroporous structure from sorption chamber to regeneration chamber and back. For example, the macroporous structure may only be situated within the sorption chamber, to guide air towards the entrance of the pores, but has less benefit in the regeneration chamber. The elevated temperatures in the regeneration chamber ensure efficient desorption of the $CO_2$ molecules, that it is not needed to force a regeneration gas towards the entrance of the pores. On the other hand, the device according to the invention would also be functional in case the macroporous structure would move together with the microporous structure from the sorption chamber to the regeneration chamber and back, such that in the sorption chamber air is led through the macroporous structure, and in the regeneration chamber regeneration gas is led through. Thus in a preferred embodiment, the microporous and macroporous structure together form a single integrated hierarchical structure. Such a structure has both larger macropores and smaller micropores, for example wherein the walls of the macropores contain the micropores.

The advantages of the macroporous structure are fully exploited in two preferred embodiments. The device according to the first preferred embodiment comprises a "sandwich of foils" (FIG. 1), wherein the combination of microstructures with sorbent and macrostructures are stuck on top of each other in a way that forces the air to flow in close contact to the sorbent, or preferably in close contact to the opening of the needle-shaped micropores that contain the sorbent. The device according to the second preferred embodiment comprises a honeycomb structure (FIG. 2), wherein air flows inside each of the tubes of the honeycomb, which are coated with the sorbent, or preferably have the needle-shaped micropores that contain the sorbent on the inner surface of a honeycomb channel. These configurations form air channels of preferably 50 μm-10 mm wide, preferably 75 μm-5 mm wide. The inventors found that such air channels allow for a flow of air without much pressure needed to force the air through, but at the same time allow for close contact of the air with sorbent or the opening of the needle-shaped micropores.

The sandwich of foils structure entails thin layers of foils structures such that the air is forced through channels in between the foils, such as depicted in FIG. 1. Herein, the air is led through narrow channels, the walls of which contain the micropores, which are coated with the sorbent. In one embodiment, this may take the form of a thin layer of sorbent coated on the wall of the pores, optionally also on the walls of support outside the pores, over which the flow of air is effected and $CO_2$ molecules from the flow of air are sorbed onto the sorbent. In an alternative embodiment, this may take the form of a microporous support containing needle-shaped pores, the interior surface of which is coated with a thin layer of sorbent. The flow of air is effected over the wall containing the entrances of the pores, and $CO_2$ molecules diffuse into the pores and are adsorbed therein. The width of the channels in between the foils is preferably 50-500 μm, more preferably 75-250 μm, most preferably 100-200 μm. Such channels are obtained by placing adjacent foils parallel, having a spacing between two foils equal to the desired width of the channel. One or more holes in each of the foils allows the air to pass from one inter-foil space to the next inter-foil space, as such creating a flow of air along the foils, which are coated with the sorbent. The holes preferably have the same diameter as the width of the channels. As the skilled person will appreciate, and as depicted in FIG. 1, the holes should in adjacent foils should not be aligned. Herein, it is preferred that 2-100 foils are stacked, more preferably 5-50 foils, most preferably 10-25 foils. The foils can be of any suitable material to support the sorbent, optionally the sorbent with the microporous support.

The honeycomb structure entails macroscopic tubes, the walls of which contain the micropores coated with the sorbent according to the invention, as depicted in FIG. 2. These tubes form channels, which are preferably hexagonal, rectangular or square in cross-section. Such tubes provide optimal stacking of multiple tubes in three-dimensional space. In one embodiment, this may take the form of a thin layer of sorbent coated on the walls of the pores. The flow of air is effected through the rubes, over the entrances of the pores, and $CO_2$ molecules from the flow of air diffuse into the pores and are sorbed onto the sorbent. In an alternative embodiment, this may take the form of a microporous support containing needle-shaped pores, the interior surface of which is coated with a thin layer of sorbent. The flow of air is effected over the wall containing the entrances of the pores, and $CO_2$ molecules diffuse into the pores and are adsorbed therein. The width of the channels or tubes is preferably 0.1-10 mm, more preferably 0.5-5 mm, most preferably 1-2 mm.

Process

The process according to the invention is for capturing $CO_2$ from air and comprises:
   (i) providing a flow of air through the sorption chamber over the surface of a microporous structure, containing a molecular monolayer of $CO_2$ sorbent coated on the interior surface of the pores, to obtain air depleted in $CO_2$ and a loaded $CO_2$ sorbent;

(ii) moving the microporous structure containing the loaded $CO_2$ sorbent from the sorption chamber to a regeneration chamber;

(iii) regenerating the $CO_2$ sorbent at the regeneration chamber, to obtain a product flow comprising $CO_2$ and regenerated $CO_2$ sorbent.

Preferably, the process according to the invention is performed in the device according to the invention. Herein, sorption of $CO_2$ by the $CO_2$ sorbent occurs at the sorption chamber, to obtain a loaded sorbent, and regeneration of the loaded sorbent occurs at the regeneration chamber, to obtain the regenerated $CO_2$ sorbent. Regeneration typically occurs at elevated temperature. Typically, the process according to the invention further comprises (iv) moving or transporting the microporous structure containing the regenerated $CO_2$ sorbent from the regeneration chamber to the sorption chamber. Herein, it is preferred that the process operates in cyclic mode, wherein steps (i)-(iv) are repeated continuously.

During (i), sorption takes place, i.e. $CO_2$ molecules present in the air are adsorbed by the solid state $CO_2$ sorbent, such that the sorbent is loaded with $CO_2$. The moving of (ii) ensures that the loaded sorbent is transported from a sorption section to a regeneration section. During (iii), regeneration takes place, i.e. $CO_2$ molecules adsorbed to the solid state $CO_2$ sorbent are desorbed (as gas-phase $CO_2$) and the sorbent is regenerated and available for another sorption phase in (i).

The thickness of the thin layer of solid state $CO_2$ sorbent is 1 molecule. Such thicknesses of the sorbent layer allow efficient sorption of the $CO_2$ molecules comprised in the air onto the sorbent. An additional advantage of the thin layer is that it can be heated and cooled in a relatively short amount of time, which allows for a quick adsorption and regeneration cycle as well as increased energy efficiency.

During operation, the microporous structure moves, such that the sorbent passes from sorption chamber to regeneration chamber, to sorption chamber to regeneration chamber, and so on. Preferably, the movement of (ii) is continuous, although intermittent movement is also possible. Accordingly, the sorbent migrates from a sorption environment at reduced temperature (typically ambient temperature), i.e. the sorption section, to a regeneration environment, which is typically at elevated temperature, i.e. the regeneration section. Thus, sorbent is loaded with $CO_2$ when the microporous structure is located at the sorption chamber. Sorbent loaded with $CO_2$ is then conveyed towards a regeneration chamber, where the $CO_2$ molecules are desorbed and the sorbent is regenerated. Then, the regenerated sorbent is transported, for example rotated, towards a sorption chamber, and is used again for capturing $CO_2$ from air. The sequence of one sorption stage and one regeneration stage is herein referred to as a cycle. This sequence of steps may continue for an extended period of time, during which $CO_2$ is captured from the air in the sorption chamber, desorbed in the regeneration chamber and ends up in the $CO_2$ product flow.

The conditions during (i) are such that sorption occurs, which may vary from sorbent to sorbent. These conditions typically include ambient pressure and temperature, although deviation thereof may occur without significantly jeopardizing the sorption efficiency of the process according to the invention. The conditions during (iii) are such that desorption occurs, which typically includes elevated temperature. Elevated temperature herein refers to a temperature that is higher than the temperature during (i). The optimal conditions for regeneration or $CO_2$ desorption may vary from sorbent to sorbent and typically include ambient pressure, although deviation thereof may occur without significantly jeopardizing the sorption efficiency of the device according to the invention. Optimal results are obtained with desorption at elevated temperature in the range of 50-180° C., preferably 60-150° C., most preferably 65-100° C. For the operation of the process according to the invention, the $CO_2$ sorbent positioned on the microporous structure is preferably at the elevated temperature, and whether or not the surroundings thereof are also at elevated temperature is not important. After all, desorption occurs within the $CO_2$ sorbent.

During one full cycle, the microporous structure passes through at least one sorption section and one regeneration section. Multiple of such sections are also possible, in line with the sorption and regeneration chambers as defined for the device according to the invention. The speed at which the microporous structure moves highly depends on the size of the microporous structure, the size (length) of the sorption and regeneration sections and the number of sorption and regeneration sections arranged around the microporous structure. For example, the speed may be such that the residence time of the solid state sorbent within a single sorption section is 0.1-60 seconds, preferably 0.2-30 s, more preferably 0.3-10 s, more preferably 0.5-5 s. Having more sections thus means that the microporous structure may move slower. Because of the thinness of the sorption layer within the microporous structure, the sorbent may be saturated with $CO_2$ molecules within 0.1-60 seconds, preferably 0.2-30 s, more preferably 0.3-10 seconds, more preferably 0.5-5 seconds. Regeneration typically occurs at the same time scales. In view of the rapid saturation, the residence time of the sorbent in each of the chambers is preferably short, preferably 0.1-60 seconds, preferably 0.2-30 s, more preferably 0.3-10 seconds, most 0.5-5 seconds.

During (i), a flow of air is effected over the surface of the sorbent. The velocity of the flow of air is not crucial for the present invention. Since surface adsorption is a rapid process, the invention is capable of dealing with a wide variety of air velocities, such as in the range of 0.1-20 m/s, preferably 0.5-10 m/s.

Uses

As explained above, the present invention centres around the use of a molecular monolayer of $CO_2$ sorbent for capturing $CO_2$ directly from air, making use of the surface adsorption of $CO_2$ sorbent rather than their bulk absorption. The sorbent is coated on the pore walls of a microporous support, and optionally on the surface of the microporous support outside the pores. The pores and the sorbent that coats the interior walls thereof is defined in more detail in the context of the device according to the invention. In a preferred embodiment, the sorbent is coated onto microporous support, which contains needle-shaped pores as defined above, preferably with a diameter in the range of 1-10 nm and a length of 1-10 μm, and each needle-shaped pore is coated with a thin layer of sorbent. In an alternative embodiment, the sorbent is coated onto microporous support, which contains channel-type pores as defined above. In another preferred embodiment, the device comprises a "sandwich of foils" or a honeycomb macroporous structure as described above. Preferably, wherein the use involves a flow of air within the macroporous structure, preferably perpendicular to the micropores of the microporous structure. The use according to the invention is preferably performed with the device according to the invention. Likewise, it is preferred that the use according to the invention employs the process according to the invention.

Although it is especially preferred to use the monolayer of solid state $CO_2$ sorbent for capturing $CO_2$, as set out above, other gaseous species may also be captured using the invention. Preferred species include sulphur oxides and nitrogen oxides, ($SO_x$ and/or $NO_x$). Sorbents selective for those species are known in the art, and include calcium and copper oxides (e.g. $CaO_x$, $CuO_x$). In further embodiment, the use involves the capture of gaseous molecules from a gas mixture other than air. The molecule to be captured may be present in small or large quantities, such as up to 15 vol. % or up to 10 vol. %. In a preferred embodiment, the gas mixture is characterized by its low content of the gaseous molecules to be captured, which is typically less than 0.5 vol. %, or even less than 0.1 vol. %. The invention is suitable to remove such gaseous molecules that are present in low content, as illustrated by $CO_2$ removal from air (air has a $CO_2$ content of only 0.04 vol. %). In a preferred embodiment, $CO_2$ is captured from the gas mixture, most preferably from air.

The device according to the invention is a great improvement over known devices for capturing $CO_2$ from air. First and foremost, because of its high efficiency, sufficient $CO_2$ can be captured to provide an economically viable process. In other words, the operating costs (OPEX) of the device according to the invention are significantly reduced compared to known devices. Especially the speed of $CO_2$ capture is greatly improved over prior art devices that rely on slow bulk absorption. Furthermore, the device according to the present invention enables the formation of a product stream of pure $CO_2$, optionally after removal of $H_2O$, such that no costly separation techniques are required. Separation of $CO_2$ from $H_2O$ is well-known in the art and easily performed, for example by condensation of $H_2O$. The $CO_2$ obtained by the present invention can be used in any way deemed fit, such as for storage or further processing.

A further advantage of the device according to the invention is that it is fully scalable to the needs of the user. Parameters that can be adjusted to the specific situation include, size of the micropores in the microporous structure (width and length), width of the solid state sorbent coating, the times allocated for adsorption and desorption, the flow of air; and in particular for the "sandwich of foils" structure, the amount of foils stacked on top of each other, the distance between the foils, the porosity of the macrostructures; and in particular for the honeycomb structure: the amount of chambers, the size (width and length) of each chamber. Especially for its application during the energy transition, wherein society is slowly switching to renewable source, the scalable system can be implemented in many situations and adapted to the requirements of that situation, including industrial scale devices for capturing millions of tonnes of $CO_2$ yearly and small scale domestic devices for capturing amounts of $CO_2$ that are factors lower.

FIGURES

In FIG. 1, the "sandwich of foils" structure is depicted, and in FIG. 2 the honeycomb structure.

Figure 1:
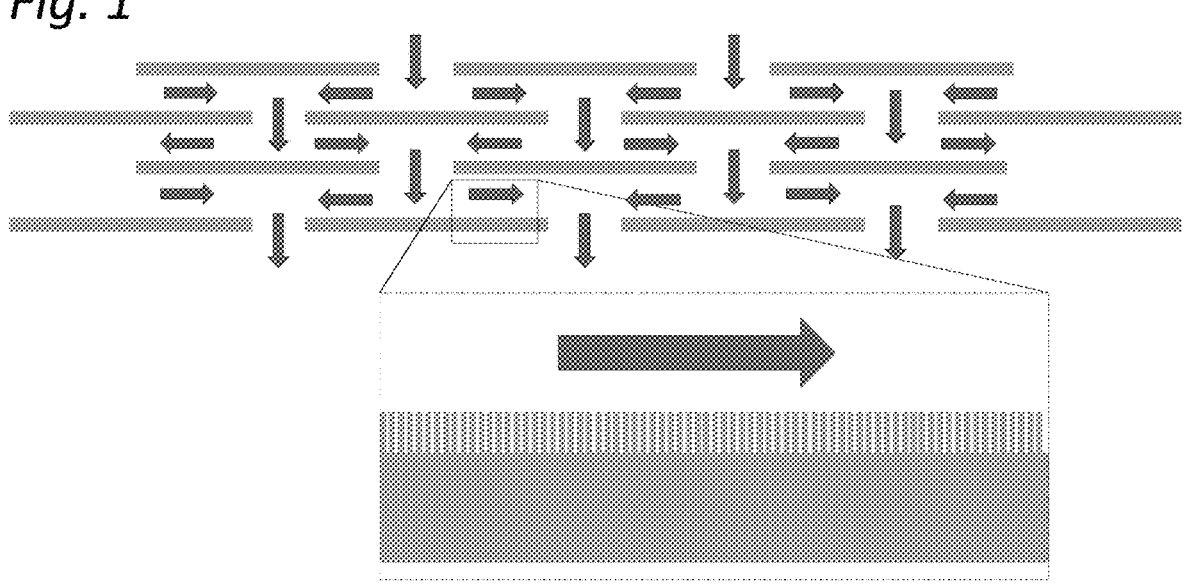
FIGS. 1-2 depict preferred embodiments of the device and process according to the invention, wherein the macroporous structure is combined with the needle-shaped micropores.
Figure 2:
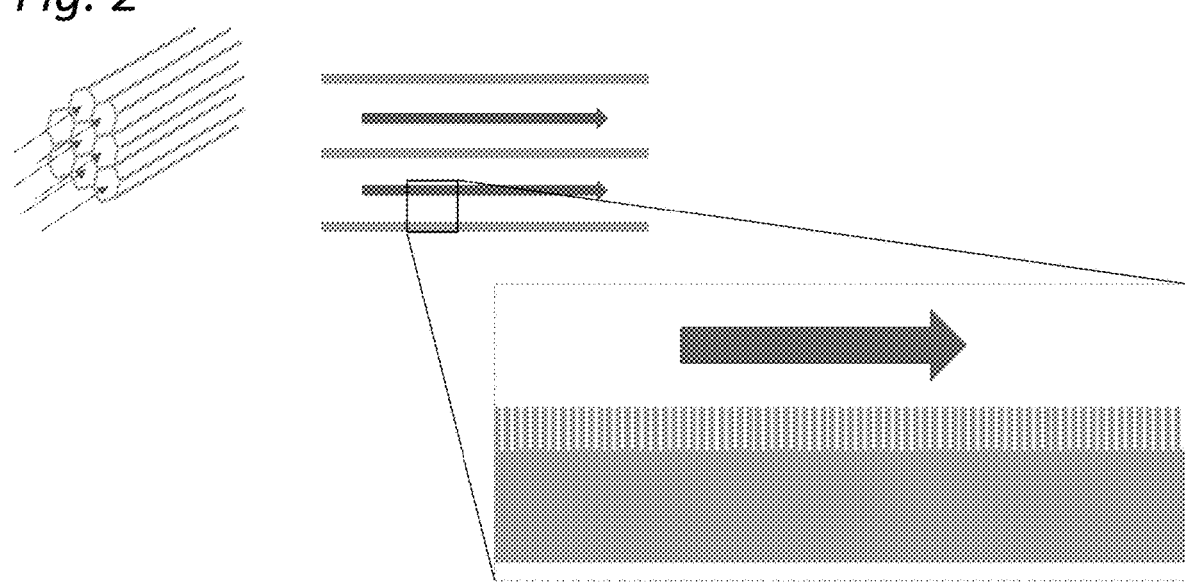
Figure 3A:
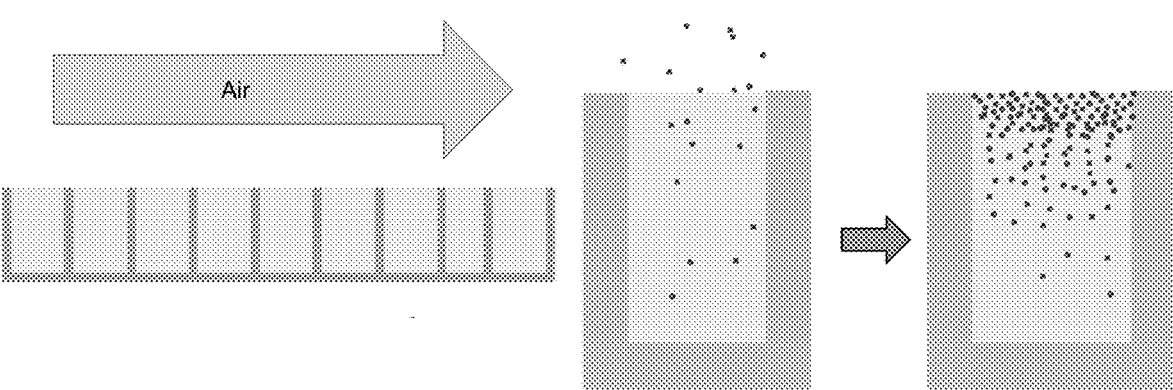
FIG. 3A
Figure 3B:
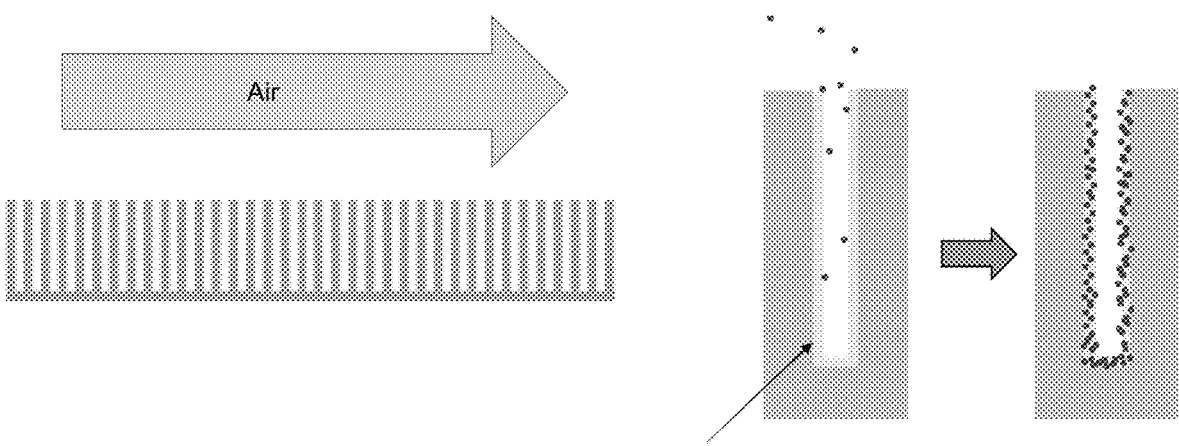
FIG. 3 depicts the working of the present invention with respect to the conventional $CO_2$ capturing system.

14 shows a porous structure, wherein the pores are filled with $CO_2$ sorbent. $CO_2$ molecules that pass over the pores in the flow of air are adsorbed by the sorbent and diffuse into the interior of the sorbent bulk. Due to the large bulk, the sorbent has a big capacity for $CO_2$, but the kinetics of sorption are slow. FIG. 3B shows a porous structure, wherein the interior walls of the pores are coated with a thin layer of $CO_2$ sorbent (indicated with the arrow). $CO_2$ molecules that pass over the pores in the flow of air diffuse into the interior of the pores, in view of the reduced partial $CO_2$ pressure, and are then adsorbed on the surface of the sorbent. Due to the thin layer, the sorbent has a small capacity for $CO_2$, but the kinetics of sorption are much faster, since $CO_2$ molecules are sucked into the pores.

Figure 4:
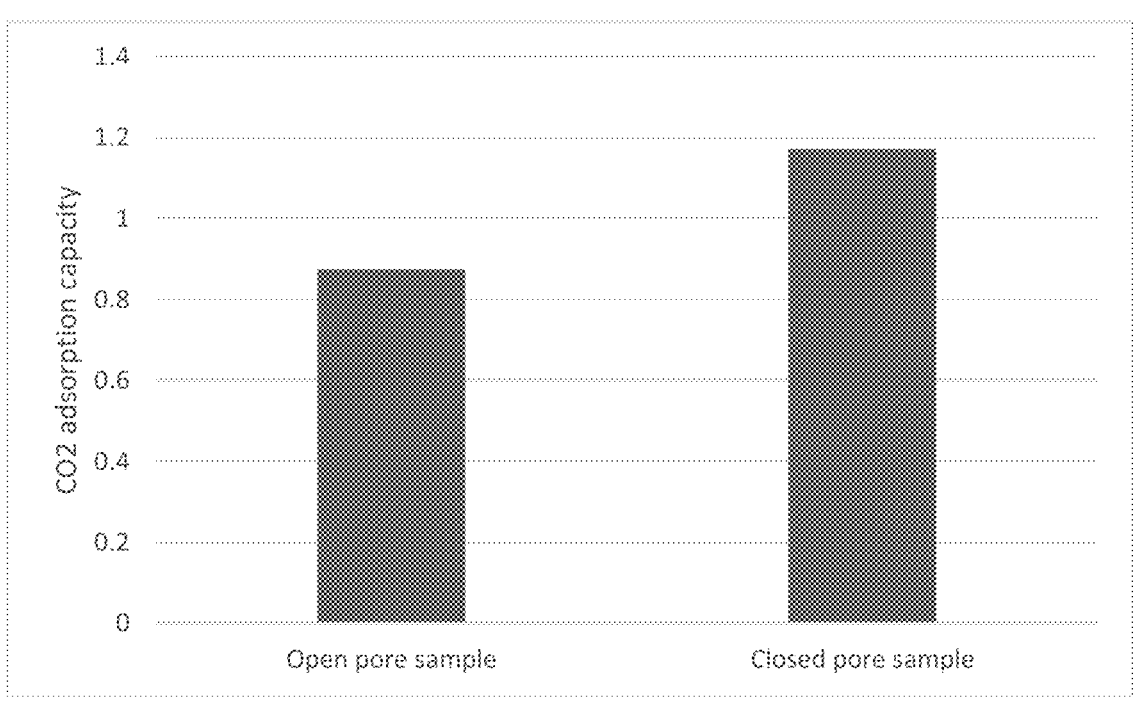

FIG. 4 shows the results of the $CO_2$ capacity experiment (in $g/m^3$), as determined using a dedicated reactor containing a mass spectrometer for online $CO_2$ detection. The results of the conventional sorbent system (filled pores) and the sorbent system according to the invention (closed pores) are depicted.

EXAMPLE

The following example illustrates the invention.

A conventional sorbent system was prepared by depositing sorbent molecule on a porous support with a density of 250 g per $m^2$ of material, using wet-chemical method, such as disclosed in Zeng et al, *J. Phys. Chem.* 2011, 115, 450-454. Success of the deposition process was measured by monitoring the weight increase of the support structure (including any deposited sorbet) in situ. The saturation of the sorbent (bulk vs. monolayer) was controlled by choosing the saturation levels of the sorbent amino-organo-silane precursor, which was applied as a toluene solution. For example, by controlling the exposure to different precursor concentrations, the inventors produced two samples, one microporous support structure largely filled with sorbent molecules and the other having a monolayer of sorbent across the available surface area. The monolayer-coated support was prepared using 0.001-0.005 mol/L amine precursor, while the comparative sorbent-filled support was prepared using a concentration of 0.01-0.05 mol/L amine precursor. The specific sample filled with sorbent exhibited a 35% weight gain, while the sorbent system according to the present invention exhibited a 5% weight gain. In other words, the convention sorbent systems contained 7 times more sorbent than the sorbent system according to the invention.

The sorbent system according to the invention contained seven times less sorbent compared to the conventional sorbent system (pores filled with sorbent), as illustrated by the weight gain of the porous support during the preparation. The samples were subjected to BET surface area measurements to show that the pores of the conventional sorbent system were indeed largely filled, while the pores of the sorbent system according to the present invention where open.

Both sorbent systems where contacted with ambient air for 24 h at ambient temperature, pressure and fixed relative humidity (60%) to test the initial capacity by initial degassing of the sorbent for $CO_2$. The $CO_2$ capacity of the sorbent was measured using a dedicated reactor containing a mass spectrometer for online $CO_2$ detection. The results are depicted in FIG. 4 ($CO_2$ sorption capacity in $g/m^3$).

The invention claimed is:
1. A process for capturing $CO_2$ from air using a device comprising a sorption chamber, a regeneration chamber and a porous support structure comprising a surface containing pores, the process comprising:

(i) providing a flow of air through the sorption chamber over the surface of the a porous support structure to obtain air depleted in $CO_2$ and a loaded $CO_2$ sorbent;

(iii) regenerating the $CO_2$ sorbent at the regeneration chamber to obtain a product flow comprising $CO_2$ and regenerated $CO_2$ sorbent, wherein the pores have an interior surface coated with a molecular monolayer of $CO_2$ sorbent having a thickness in the range of 0.1-3 nm, while the central part of the pores is free of sorbent and open to receive gaseous molecules, wherein the $CO_2$ sorbent is a bicarbonate-based sorbent or an amine-based sorbent.

2. The process according to claim 1, wherein the process further comprises:

(ii) moving the porous support structure containing the loaded $CO_2$ sorbent from the sorption chamber to a regeneration chamber;

(iv) moving the porous support structure containing the regenerated $CO_2$ sorbent from the regeneration chamber to the sorption chamber;

and wherein steps (i)-(iv) are repeated.

3. The process according to claim 1, wherein step (i) has a cycle time in the range of 0.1-60 seconds and step (iii) has a cycle time in the range of 0.1-60 seconds.

4. The process of claim 1, wherein the molecular monolayer of $CO_2$ sorbent has a thickness in the range of 0.1-1 nm.

5. A device for capturing $CO_2$ from air, comprising:

(a) a porous support structure comprising a surface containing pores, wherein the pores have an interior surface coated with a molecular monolayer of solid state $CO_2$ sorbent having a thickness in the range of 0.1-3 nm, while the central part of the pores is free of sorbent and open to receive gaseous molecules, wherein the $CO_2$ sorbent is a bicarbonate-based sorbent or an amine-based sorbent;

(b) at least one sorption chamber;

(c) at least one regeneration chamber;

(d) an air displacement device or suction device that enables a flow of air over the sorbent support structure through the sorption chamber;

(e) at least one outlet for discharging $CO_2$, located in the regeneration chamber; and (f) means for regenerating the sorbent in the regeneration chamber.

6. The device according to claim 5, wherein the pores have a diameter in the range of 1-10 nm and a length in the range of 1-10 μm.

7. The device according to claim 5, wherein the porous support comprises a macroporous structure layered on top of a microporous structure, optionally wherein the macroporous structure is selected from a sandwich of foils or a honeycomb structure.

8. The device according to claim 5, further including transporting means to shift the sorbent from absorption to regeneration phase.

9. The device according to claim 5, wherein means (g) are capable of heating the $CO_2$ sorbent when positioned within the regeneration chamber to a temperature in the range of 50-180° C.

10. The device according to claim 5, wherein the $CO_2$ sorbent is a bicarbonate-based sorbents.

11. The device of claim 5, wherein the molecular monolayer of $CO_2$ sorbent has a thickness in the range of 0.1-1 nm.

12. A method for capturing $CO_2$ from air using a molecular monolayer of $CO_2$ sorbent comprising:

providing a porous support comprising pore walls coated with the molecular monolayer of $CO_2$ sorbent, wherein the $CO_2$ sorbent is a bicarbonate-based sorbent or an amine-based sorbent and the molecular monolayer has a thickness in the range of 0.1-3 nm, and contacting the porous support with a flow of air comprising $CO_2$.

13. The method of claim 12, wherein $CO_2$ sorption occurs via surface adsorption and not via bulk absorption.

14. The method of claim 12, wherein the porous support is a microporous support.

15. The method of claim 12, wherein the porous support contains needle-shaped pores with a diameter in a range of 1 to 10 nm and a length in a range of 1 to 10 μm, and wherein a surface of the pores is coated with the sorbent while a central part is free of sorbent and open to receive gaseous molecules.

16. The method of claim 12, wherein the porous support comprises a macroporous structure layered on top of a microporous structure.

17. The method of claim 16, wherein the macroporous structure is a sandwich of foils or a honeycomb structure.

18. The method of claim 17, further comprising leading air through the macroporous structure to enable a flow of air perpendicular to the micropores of the microporous structure, such that $CO_2$ molecules diffuse into an interior of the pores and are adsorbed onto the sorbent therein.

19. The method of claim 12, wherein the molecular monolayer of $CO_2$ sorbent has a thickness in the range of 0.1-1 nm.

* * * * *